US012541170B2

(12) United States Patent
Arata

(10) Patent No.: US 12,541,170 B2
(45) Date of Patent: Feb. 3, 2026

(54) IMAGE FORMING APPARATUS INCLUDING UNIT ATTACHABLE AND DETACHABLE WITH RESPECT TO MAIN BODY THEREOF

(71) Applicant: KYOCERA Document Solutions Inc., Osaka (JP)

(72) Inventor: Tatsuro Arata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/843,635

(22) PCT Filed: Feb. 22, 2023

(86) PCT No.: PCT/JP2023/006439

§ 371 (c)(1),
(2) Date: Sep. 3, 2024

(87) PCT Pub. No.: WO2023/167068

PCT Pub. Date: Sep. 7, 2023

(65) Prior Publication Data

US 2025/0189925 A1 Jun. 12, 2025

(30) Foreign Application Priority Data

Mar. 4, 2022 (JP) ................................ 2022-033256

(51) Int. Cl.
*G03G 21/16* (2006.01)

(52) U.S. Cl.
CPC ..... *G03G 21/1647* (2013.01); *G03G 21/1633* (2013.01); *G03G 21/168* (2013.01);
(Continued)

(58) Field of Classification Search
CPC .. G03G 15/16; G03G 15/1605; G03G 15/161; G03G 21/16; G03G 21/1633;
(Continued)

(56) References Cited

U.S. PATENT DOCUMENTS

2017/0300003 A1 10/2017 Tokoro ................. G03G 21/168
2021/0373486 A1 12/2021 Morita ............... G03G 21/1647
(Continued)

FOREIGN PATENT DOCUMENTS

EP 1308794 A2 * 5/2003 ......... G03G 21/1676
JP 2000-147977 A 5/2000
(Continued)

OTHER PUBLICATIONS

International Search Report mailed May 9, 2023, issued to the corresponding International Application No. PCT/JP2023/006439.

*Primary Examiner* — Sophia S Chen
(74) *Attorney, Agent, or Firm* — Stein IP, LLC

(57) ABSTRACT

An image formation device (100) comprises a unit (30) that can be attached to and detached from a body frame (101), and a lock mechanism (40). The lock mechanism (40) has a grip part (37) that can move reciprocally in the attachment direction and the detachment direction of the unit (30), a lock member (41) that is swingably positioned in the unit (30) and has a hook part (**41*b*) capable of engaging with an engagement-receiving part (50) formed on the body frame (101), and a first biasing member (43) that biases the lock member (41) in a first direction, in which the hook part (41*b*) engages with the engagement-receiving part (50). Due to the grip part (37) being moved in the detachment direction, the lock member (41) swings in a second direction that is the opposite of the first direction, in opposition to the biasing force of the first biasing member (43), and the engagement of the hook part (41) and the engagement-receiving part (50) is released. The lock member (41) has a restriction part (41*e*) that restricts the swinging of the lock member (41) in the second direction while the grip part (37**) is not moved in the detachment direction.

8 Claims, 11 Drawing Sheets

(52) U.S. Cl.
CPC ............... *G03G 2221/1642* (2013.01); *G03G 2221/1654* (2013.01)

(58) Field of Classification Search
CPC ............. G03G 21/1647; G03G 21/168; G03G 2221/1642; G03G 2221/1654
See application file for complete search history.

(56) References Cited

U.S. PATENT DOCUMENTS

| | | | | |
|---|---|---|---|---|
| 2022/0269215 | A1* | 8/2022 | Shiraishi ............ | G03G 15/6511 |
| 2022/0413428 | A1* | 12/2022 | Ozawa ............... | G03G 21/1647 |
| 2025/0130525 | A1* | 4/2025 | Nieda ................ | G03G 21/1647 |

FOREIGN PATENT DOCUMENTS

| | | | |
|---|---|---|---|
| JP | 2017-194490 | A | 10/2017 |
| JP | 2021-189423 | A | 12/2021 |

* cited by examiner

IMAGE FORMING APPARATUS INCLUDING UNIT ATTACHABLE AND DETACHABLE WITH RESPECT TO MAIN BODY THEREOF

CROSS-REFERENCE TO RELATED APPLICATIONS

This application is a national stage of International Application No. PCT/JP2023/006439 on Feb. 22, 2023, which claims the benefit of Japanese Application No. 2022-033256, filed Mar. 4, 2022, in the Japanese Patent Office, the disclosures of which are incorporated herein by reference.

TECHNICAL FIELD

The present invention relates to an image forming apparatus incorporating a unit, such as an intermediate transfer unit, that is attachable and detachable with respect to the apparatus main body.

BACKGROUND ART

Various image forming apparatuses have conventionally been proposed, among which are those adopting an intermediate transfer method. Image forming apparatuses adopting an intermediate transfer method include an endless intermediate transfer belt that is moved around in a predetermined direction, and a plurality of image forming portions provided along the intermediate transfer belt, wherein toner images are sequentially superimposed one on another on the intermediate transfer belt by the image forming portions, and are then transferred to a recording medium all at once.

In an image forming apparatus adopting the intermediate transfer method as described above, it is necessary to regularly replace the intermediate transfer belt, which has a shorter service life than the apparatus main body. To meet this necessity, wide use has been made of a configuration designed to allow an intermediate transfer unit including an intermediate transfer belt to be attachable and detachable with respect to the main body of the image forming apparatus. In this configuration, the intermediate transfer unit is fastened to the main body of the image forming apparatus by operating a rotary lever, with screws, or the like.

For example, Patent Document 1 identified below discloses an image forming apparatus having a handle member attached to one end of a rotation shaft and a lock member attached to the other end of the rotation shaft, wherein due to the lock member rotating as the handle member rotates, the unit is locked in the apparatus main body.

Patent Document 2 identified below discloses an image forming apparatus including a unit that is removably inserted in the horizontal direction with respect to a main body frame, and a lock mechanism for the unit. The lock mechanism has a lock member and a biasing member. The lock member is disposed on the unit so as to be reciprocatable in a direction orthogonal to the unit inserting-removing direction, and has an engagement projection engageable with an engaged portion formed on the main body frame. The biasing member biases the lock member in a first direction in which the engagement projection engages with the engaged portion.

CITATION LIST

Patent Literature

Patent Document 1: Japanese Unexamined Patent Application Publication No. 2000-147977

Patent Document 2: Japanese Unexamined Patent Application Publication No. 2017-194490, Summary of Invention

SUMMARY OF INVENTION

Technical Problem

Conventional methods use the biasing force of a spring (a biasing member) alone to restrain the rotation of the lock member. Unfortunately, however, if an image forming apparatus is subjected to impact due to vibration or dropping during transportation, for example, depending on the severity of the impact, it may be impossible to restrain the rotation of the lock member by the biasing force of the spring alone, and thus the locked state may be released. On the other hand, if the load on the spring is increased to make it difficult for the lock member to rotate, then it makes it difficult to detach the intermediate transfer unit, which disadvantageously makes it difficult to replace the intermediate transfer unit.

Note that, although the above description has dealt with an example where an intermediate transfer unit is attached and detached with respect to an apparatus main body, similar inconveniences are experienced also in cases where other units are attached and detached with respect to an apparatus main body.

The present invention has been made in consideration of the above inconveniences, and has its object to provide an image forming apparatus capable of securely holding a unit attachable and detachable with respect to an apparatus main body in a state of being locked in the apparatus main body without impairing the attachability and detachability of the unit.

Solution to Problem

To achieve the above object, according to a first configuration, an image forming apparatus includes a unit that is attachable and detachable with respect to a main body frame, and a lock mechanism that releasably holds the unit in a state of being attached in the main body frame. The lock mechanism includes a handle portion, a lock member, and a first biasing member. The handle portion is disposed on the unit and is reciprocatable in attaching and detaching directions of the unit. The lock member is swingably disposed on the unit, and has a hook portion engageable with an engaged portion formed on the main body frame. The first biasing member biases the lock member in a first direction in which the hook portion engages with the engaged portion. Due to the handle portion being moved in the detaching direction, the lock member is caused to swing against a biasing force of the first biasing member in a second direction opposite to the first direction so as to release engagement between the hook portion and the engaged portion, thereby enabling the unit to be detached from the main body frame. The lock member includes a restraint portion that restrains swinging of the lock member in the second direction in a state where the handle portion is prevented from moving in the detaching direction.

Advantageous Effects of Invention

According to a first configuration of the present invention, the direction in which the handle portion is operated to release the lock mechanism is the same as the detaching direction of the unit, and thus the release of the lock mechanism and the operation for detaching the unit can be performed simultaneously. Accordingly, without bothering to tighten screws, turn a rotary lever, and the like, users can release a locked state of the unit with respect to the main body frame with a simple operation, and thus can replace the unit smoothly. Further, since the swinging of the lock member in the second direction is restrained by a restraint projection in the state where the handle portion is prevented from moving in the detaching direction, there is no risk of the lock member being disengaged from the engaged part due to vibration or impact. Thus, it is possible to effectively prevent the unit from rattling or coming off from the main body frame due to vibration, falling, or the like during transportation.

DESCRIPTION OF EMBODIMENTS

Figure 1:
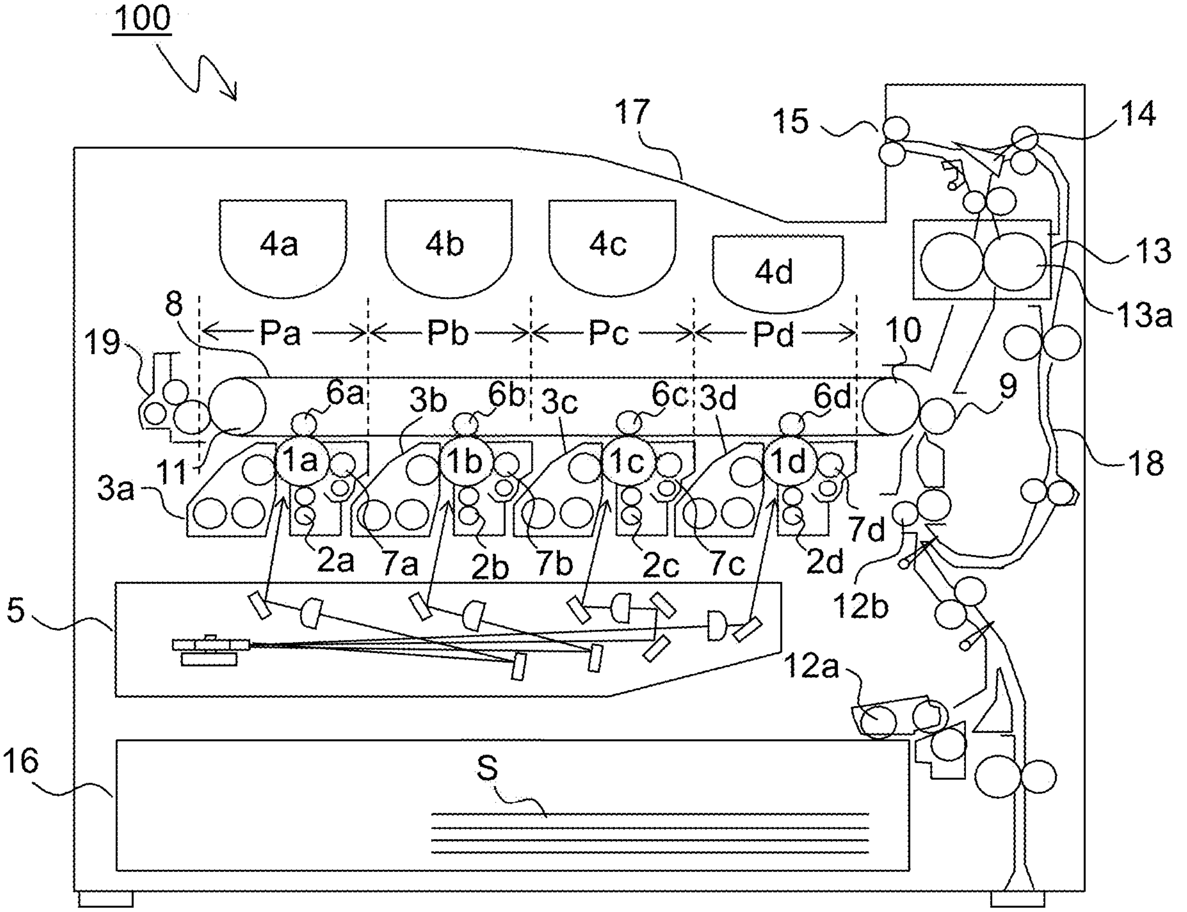
FIG. 1 A schematic sectional view illustrating an internal configuration of an image forming apparatus 100 according to an embodiment of the present invention.

Hereinafter, with reference to the accompanying drawings, embodiments of the present invention will be described. FIG. 1 is a schematic side view illustrating an internal configuration of an image forming apparatus 100 according to an embodiment of the present invention. The image forming apparatus 100 illustrated in FIG. 1 is what is called a tandem-type color printer, and has a configuration as described below. In a main body of the image forming apparatus 100, four image forming portions Pa, Pb, Pc, and Pd are arranged in this order from an upstream side (apparatus front side, left side in FIG. 1) in a conveyance direction. These image forming portions Pa to Pd are provided corresponding to images of four different colors (magenta, cyan, yellow, and black), and the image forming portions Pa to Pd sequentially form magenta, cyan, yellow, and black images through processes of electrostatic charging, exposure to light, image development, and image transfer.

In these image forming portions Pa to Pd, photosensitive drums 1*a*, 1*b*, 1*c*, and 1*d* for carrying visible images (toner images) of the respective colors are disposed. Further, adjacent to the image forming portions Pa to Pd, an intermediate transfer belt 8 is provided which is an endless belt that rotates counterclockwise in FIG. 1. Toner images formed on these photosensitive drums 1*a* to 1*d* are sequentially transferred onto the intermediate transfer belt 8, which moves in contact with the photosensitive drums 1*a* to 1*d*, and then, at a secondary transfer roller 9, the toner images are transferred all at once onto a sheet S as one example of a recording medium. Further, the toner images are fixed on the sheet S at a fixing portion 13, and the sheet S is discharged out of the main body of the image forming apparatus 100. While the photosensitive drums 1*a* to 1*d* are rotated clockwise in FIG. 1, an image forming process is performed with respect to each of the photosensitive drums 1*a* to 1*d*.

Sheets S to which toner images are to be transferred are stored in a sheet cassette 16 disposed in a lower part of the main body of the image forming apparatus 100. Each sheet S is conveyed via a sheet feeding roller 12*a* and a pair of registration rollers 12*b* to the secondary transfer roller 9.

Next, the image forming portions Pa to Pd will be described. Around the photosensitive drums 1*a* to 1*d*, there are arranged, along a drum rotation direction (clockwise direction in FIG. 1), charging devices 2*a* to 2*d*, developing devices 3*a* to 3*d*, cleaning devices 7*a* to 7*d*, and primary transfer rollers 6*a* to 6*d*, the primary transfer rollers 6*a* to 6*d* being respectively arranged across the intermediate transfer belt 8 from the photosensitive drums 1*a* to 1*d*. Further, upstream of the image forming portion Pa with respect to a rotation direction of the intermediate transfer belt 8, a belt cleaning unit 19 is disposed which faces a tension roller 11 across the intermediate transfer belt 8. The belt cleaning unit 19 removes toner left on a surface of the intermediate transfer belt 8.

Next, a description will be given of an image forming procedure performed in the image forming apparatus 100. When an instruction to start image formation is input by a user, first, due to a main motor (unillustrated), rotation of the photosensitive drums 1*a* to 1*d* is started. Then the charging devices 2*a* to 2*d* electrostatically charge surfaces of the photosensitive drums 1*a* to 1*d* uniformly. Then, the surfaces of the photosensitive drums 1*a* to 1*d* are irradiated with beam light (laser light) emitted from an exposure device 5, and thereby electrostatic latent images are formed on the photosensitive drums 1*a* to 1*d* in accordance with an image signal.

The developing devices 3*a* to 3*d* are each filled with a predetermined amount of magenta, cyan, yellow, or black toner. Note that, when, as a result of image formation performed as will be described later, the proportion of toner in a two-component developer filled in each of the developing devices 3*a* to 3*d* falls below a specified value, toner is supplied to each of the developing devices 3*a* to 3*d* from a corresponding one of toner containers 4*a* to 4*d*. The toner in the developer is supplied by the developing devices 3*a* to 3*d* onto the photosensitive drums 1*a* to 1*d*, and electrostatically adheres to the photosensitive drums 1*a* to 1*d*. Thereby, toner images are formed in accordance with the electrostatic latent images that have been formed through exposure to light from the exposure device 5.

Then, the primary transfer rollers 6*a* to 6*d* generate an electric field at a predetermined transfer voltage between the primary transfer rollers 6*a* to 6*d* and the photosensitive drums 1*a* to 1*d*. Thereby, the magenta, cyan, yellow, and black toner images on the photosensitive drums 1*a* to 1*d* are primarily transferred onto the intermediate transfer belt 8. These images of the four different colors are formed in a predetermined positional relationship with each other determined in advance for formation of a predetermined full-color image. Thereafter, in preparation for subsequently formation of new electrostatic latent images, the toner left on the surfaces of the photosensitive drums 1*a* to 1*d* is removed by the cleaning devices 7*a* to 7*d*.

Along with rotation of a driving roller 10 due to a belt driving motor (unillustrated), the intermediate transfer belt 8 starts to rotate counterclockwise. Along with the rotation of the intermediate transfer belt 8, a sheet S is conveyed from the pair of registration rollers 12*b*, with predetermined timing, to the secondary transfer roller 9 disposed adjacent to the intermediate transfer belt 8, and a full-color image is transferred onto the sheet S. The sheet S on which the toner image has been transferred is conveyed to the fixing portion 13. The toner left on the surface of the intermediate transfer belt 8 is removed by the belt cleaning unit 19.

The sheet S conveyed into the fixing portion 13 is heated and pressed by a pair of fixing rollers 13*a*, thereby having the toner images fixed on the surface thereof, and as a result, the predetermined full-color image is formed. The sheet S having the full-color image formed thereon has its conveying direction switched by a branch portion 14 branching into a plurality of directions, so that the sheet S is discharged as it is (or after being sent into a duplex-printing conveyance path 18 and subjected to duplex printing) onto a discharge tray 17 by a pair of discharge rollers 15.

Figure 2:
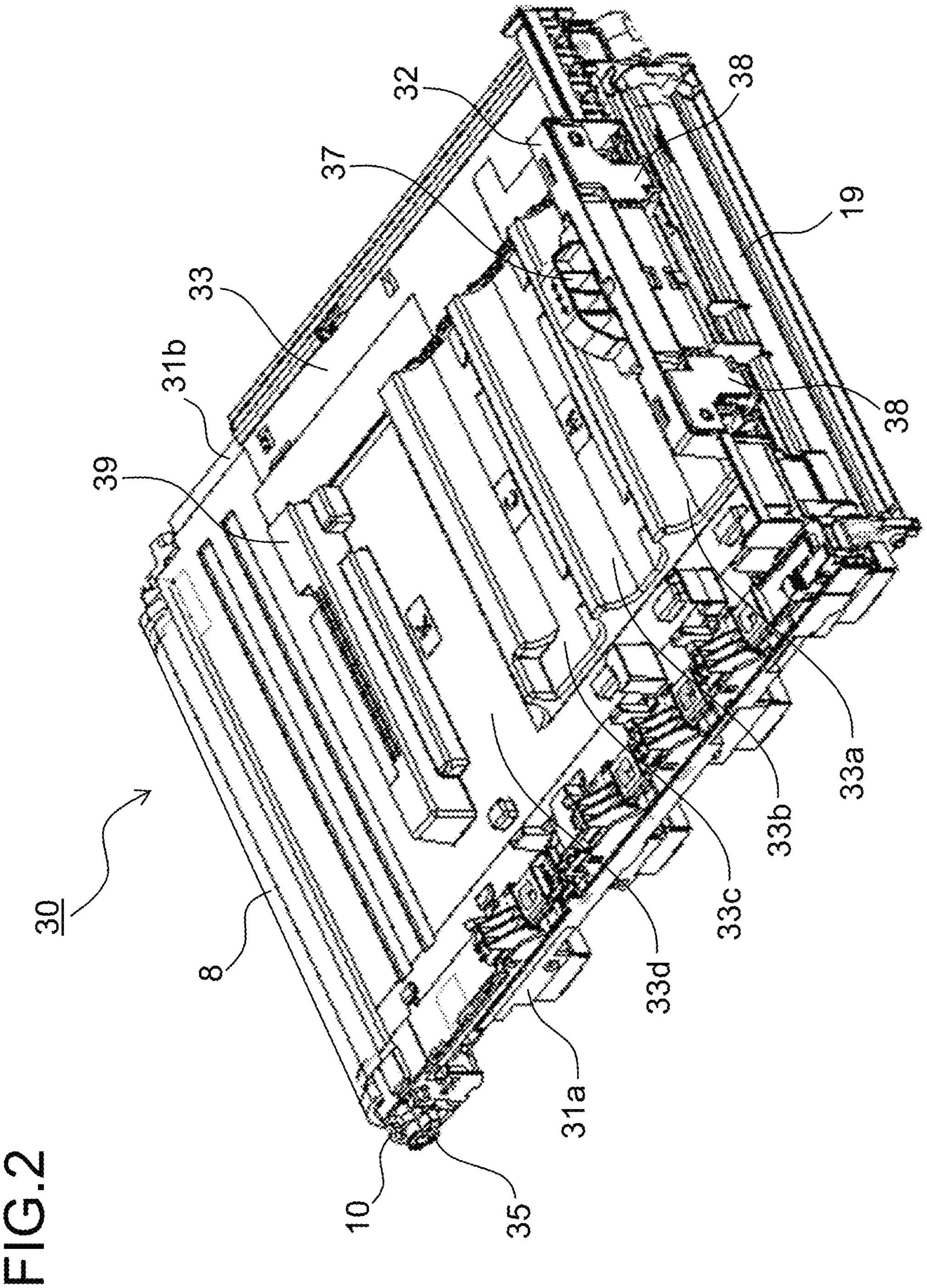
FIG. 2 An exterior perspective view of an intermediate transfer unit 30 as seen from the side where a belt cleaning unit 19 is located.

FIG. 2 is an exterior perspective view of an intermediate transfer unit 30 as seen from the side where the belt cleaning unit 19 is located. As illustrated in FIG. 2, the intermediate transfer unit 30 includes a pair of side frames 31*a* and 31*b*, a connection frame 32, and a top frame 33. The side frames 31*a* and 31*b* rotatably support a plurality of suspension rollers including the driving roller 10, the tension roller 11, and the primary transfer rollers 6*a* to 6*d*. To opposite ends of a rotary shaft of the driving roller 10, bushes (bearing members) 35 are fitted. With the intermediate transfer unit 30 attached in the image forming apparatus 100, the bushes 35 fit in positioning portions 101*a* (see FIG. 9) of the main body frame 101.

The connection frame 32 is fastened to one end parts (on the near-right side in FIG. 2) of the side frames 31*a* and 31*b* so as to bridge between them. In a top part of the connection frame 32, a first handle portion 37 is provided, and at the right and left sides of the first handle portion 37, a pair of cover members 38 are fitted.

The top frame 33 is fastened to top parts of the side frames 31*a* and 31*b* so as to bridge between them. The top frame 33 is provided with container placing portions 33*a* to 33*d*, on which the toner containers 4*a* to 4*d* (see FIG. 1) are placed, and a second handle portion 39.

Figure 3:
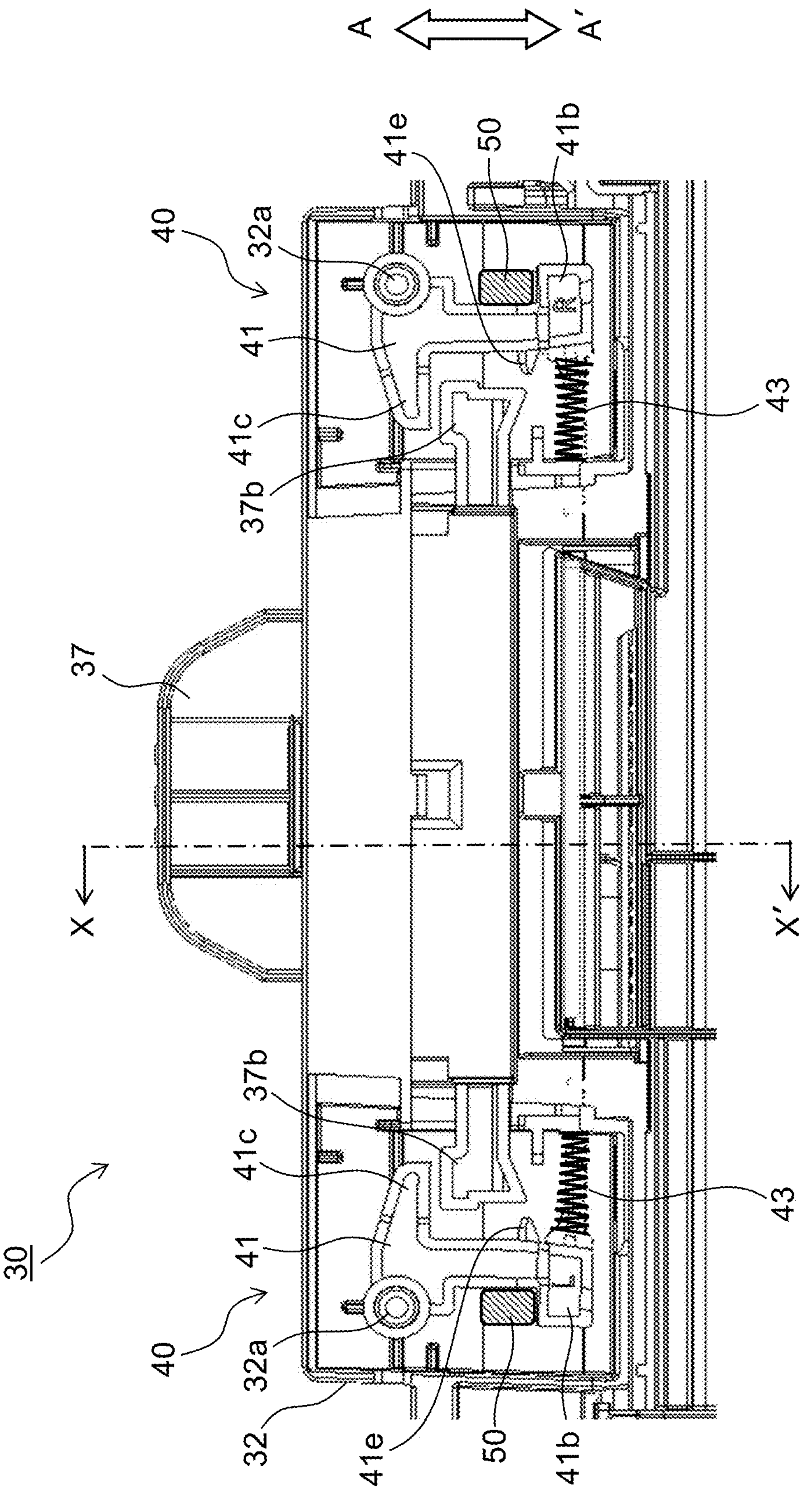
FIG. 3 A side view of the intermediate transfer unit 30 with cover members 38 removed from a connection frame 32.
Figure 4:
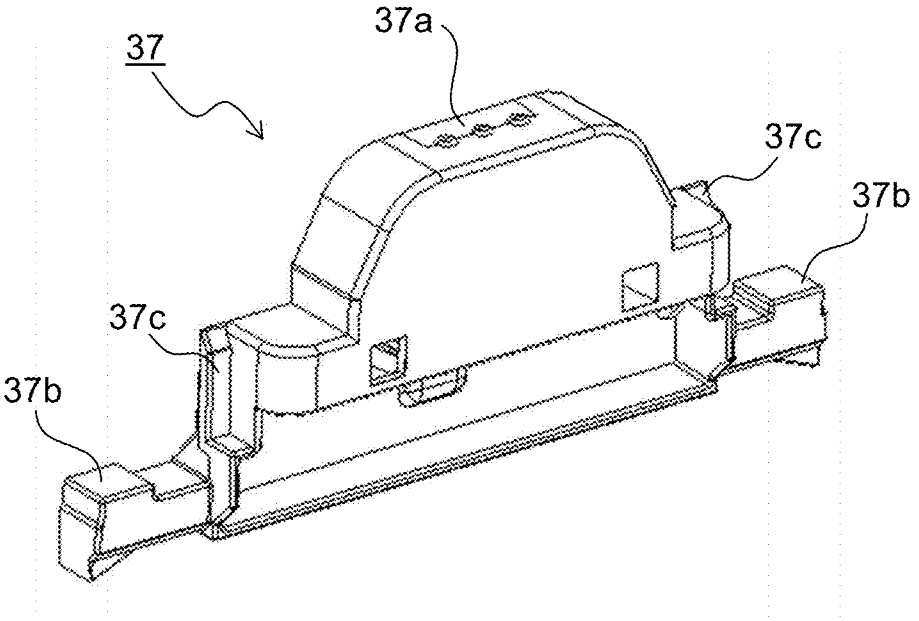
FIG. 4 An exterior perspective view of a first handle portion 37 as seen from the rear side of FIG. 3.
Figure 5:
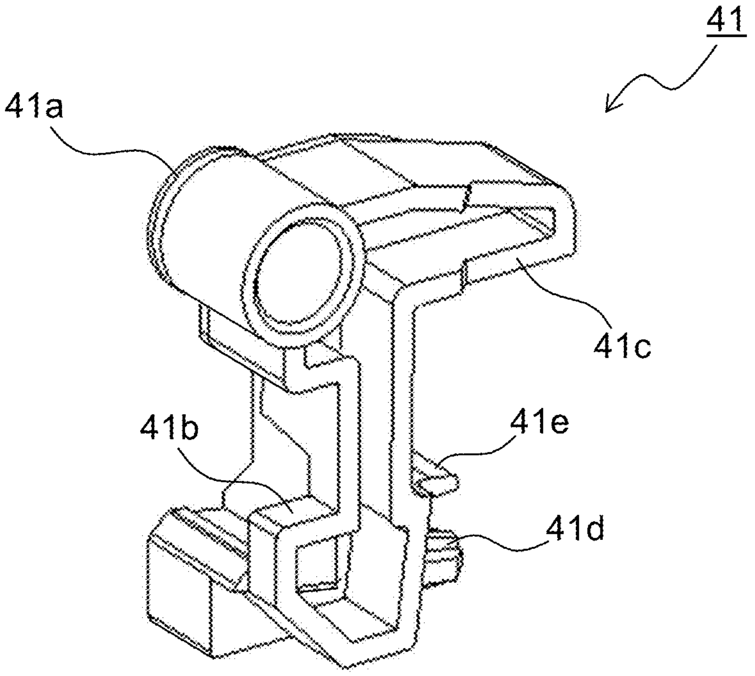
FIG. 5 A perspective view of a lock member 41 disposed inside the cover members 38.

FIG. 3 is a side view of the intermediate transfer unit 30 with the cover members 38 removed from the connection frame 32, illustrating a state where the intermediate transfer unit 30 is attached in the image forming apparatus 100. FIG. 4 is an exterior perspective view of the first handle portion 37 as seen from the rear side of FIG. 3, and FIG. 5 is a perspective view of a lock member 41 disposed inside the cover members 38. With reference to FIG. 3 to FIG. 5, a lock mechanism 40 for the intermediate transfer unit 30 will be described in detail. Note that, in the drawings referred to below, a detaching direction and an attaching direction of the intermediate transfer unit 30 as observed on the side where the connection frame 32 is located will be respectively indicated by an arrow A direction and by an arrow A' direction.

Figure 9:
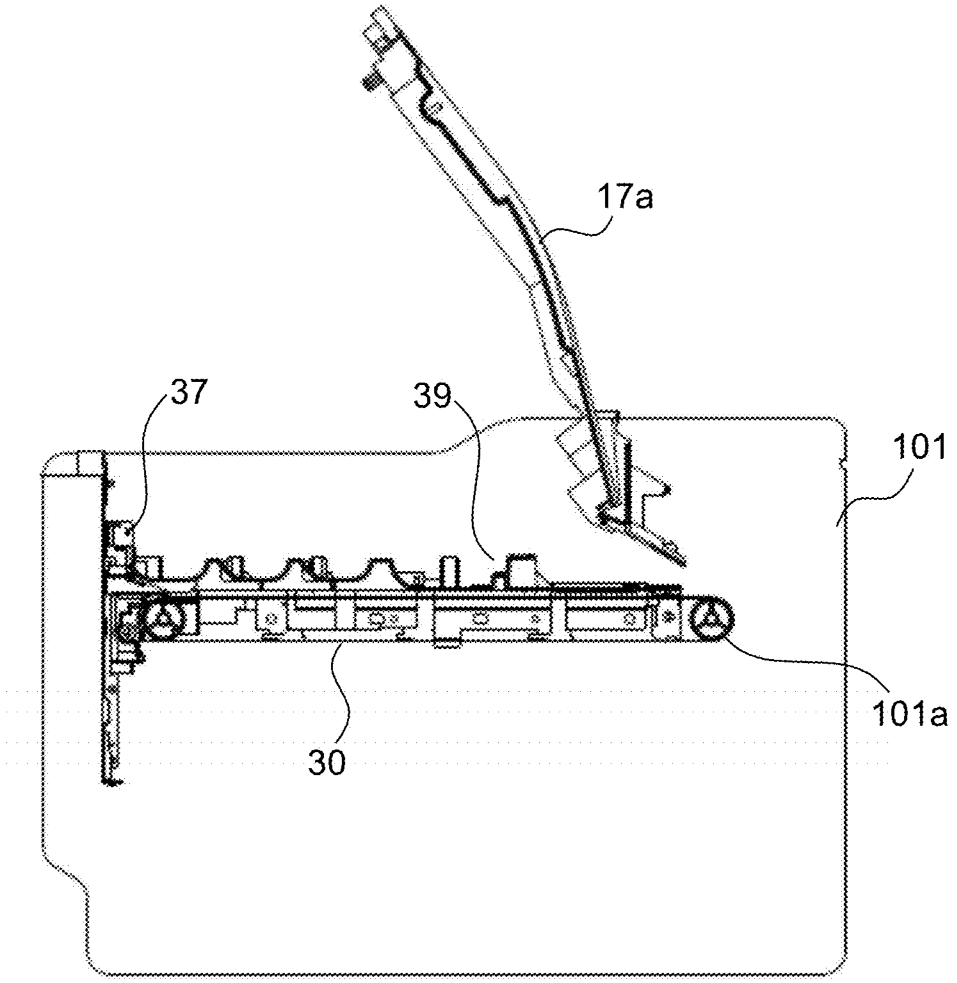
FIG. 9 A side view illustrating a state where the intermediate transfer unit 30 is attached in a main body frame 101.

As illustrated in FIG. 3, the connection frame 32 is provided with the lock mechanism 40 that releasably holds the intermediate transfer unit 30 in a state of being attached to the main body frame 101 (see FIG. 9). The lock mechanism 40 includes the first handle portion 37, the lock member 41, and a first compression spring 43. As the lock member 41 and the first compression spring 43, a pair of each are provided one on each of the right and left sides of the first handle portion 37.

As shown in FIG. 4, the first handle portion 37 has a grasp portion 37*a*, a projecting portion 37*b*, and a guide rib 37*c*. The projecting portion 37*b* projects from a lower part of the first handle portion 37. A pair of the guide ribs 37*c* are formed one on each of the left and right side surfaces of the first handle portion 37 so as to extend in an up-down direction along the side surfaces of the first handle portion 37. The guide ribs 37*c* engage with rail grooves (unillustrated) of the connection frame 32, and thereby the first handle portion 37 is supported so as to be reciprocatable in the up-down direction with respect to the connection frame 32.

As shown in FIG. 5, the lock member 41 has a boss portion 41*a*, a hook portion 41*b*, an arm portion 41*c*, a spring holding projection 41*d*, and a restraint projection 41*e*. The boss portion 41*a* is rotatably provided around a pivot shaft 32*a* (see FIG. 3) formed on the connection frame 32. The hook portion 41*b* extends in a radial direction from the boss portion 41*a*, and is engageable with an engaged portion 50 (see FIG. 3) on the main body frame 101.

The arm portion 41*c* extends from the boss portion 41*a* in a direction different from the hook portion 41*b* (in a direction substantially perpendicular with respect to the hook portion 41*b*), and faces the projecting portion 37*b* (see FIG. 4) of the first handle portion 37 from above. The spring holding projection 41*d* projects in the same direction as the arm portion 41*c* such that a diameter thereof decreases from a base portion thereof, which is on the rear side of the hook portion 41*b*, toward a tip portion thereof. The base portion of the spring holding projection 41*d* has an outer diameter (a maximum diameter) approximately equal to an inner diameter of the first compression spring 43. The restraint projection 41*e* projects from the rear side of the hook portion 41*b* in the same direction as the arm portion 41*c*. The restraint projection 41*e* is formed, between the arm portion 41*c* and the spring holding projection 41*d*, at a position that is closer to the spring holding projection 41*d*.

The first compression spring 43 has one end part thereof held by the spring holding projection 41*d* of the lock member 41, and the other end part thereof held by a spring holding portion (unillustrated) of the connection frame 32.

The first compression spring 43 biases the lock member 41 in a direction (first direction) in which the hook portion 41*b* engages with the engaged portion 50.

Figure 6:
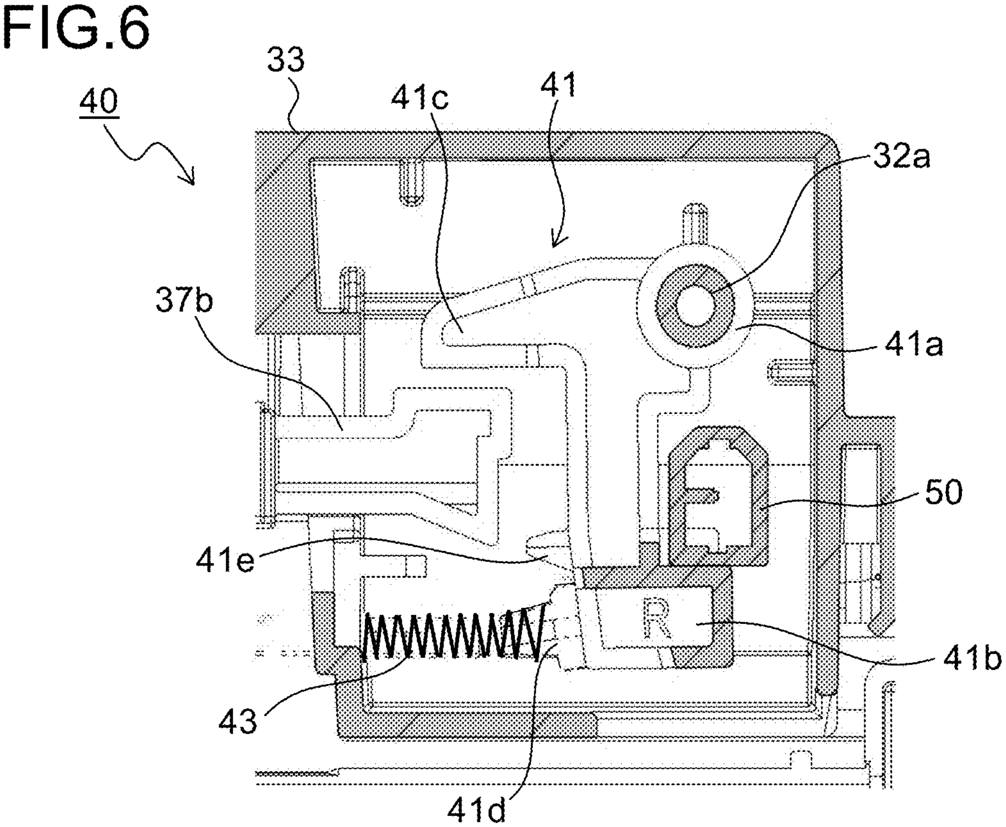
FIG. 6 An enlarged view of a lock mechanism 40 in FIG. 3, illustrating a state where the lock member 41 and an engaged portion 50 are in engagement.

Next, a description will be given of an operation of releasing the lock mechanism 40 for the intermediate transfer unit 30 with respect to the main body frame 101. FIG. 6 is an enlarged view of the lock mechanism 40 in FIG. 3, illustrating a state where the lock member 41 and the engaged portion 50 are in engagement. While the following description deals with the lock mechanism 40 at the right side of the first handle portion 37, it equally applies to the lock mechanism 40 at the left side of the first handle portion 37 except that they are bilaterally symmetric.

As shown in FIG. 6, with the intermediate transfer unit 30 attached in the main body frame 101, the hook portion 41*b* of the lock member 41 is in engagement with the engaged portion 50. The lock member 41 is biased by the first compression spring 43 in a direction (first direction; counterclockwise direction in FIG. 6) approaching the engaged portion 50. Thereby, the lock member 41 and the engaged portion 50 are kept in engagement, and the intermediate transfer unit 30 is restrained from being detached.

Further, the arm portion 41*c* of the lock member 41, from above (from an upstream side in the attaching direction of the intermediate transfer unit 30), faces a top surface of the projecting portion 37*b* of the first handle portion 37. And, the restraint projection 41*e* of the lock member 41 is disposed lateral to the projecting portion 37*b*.

Figure 7:
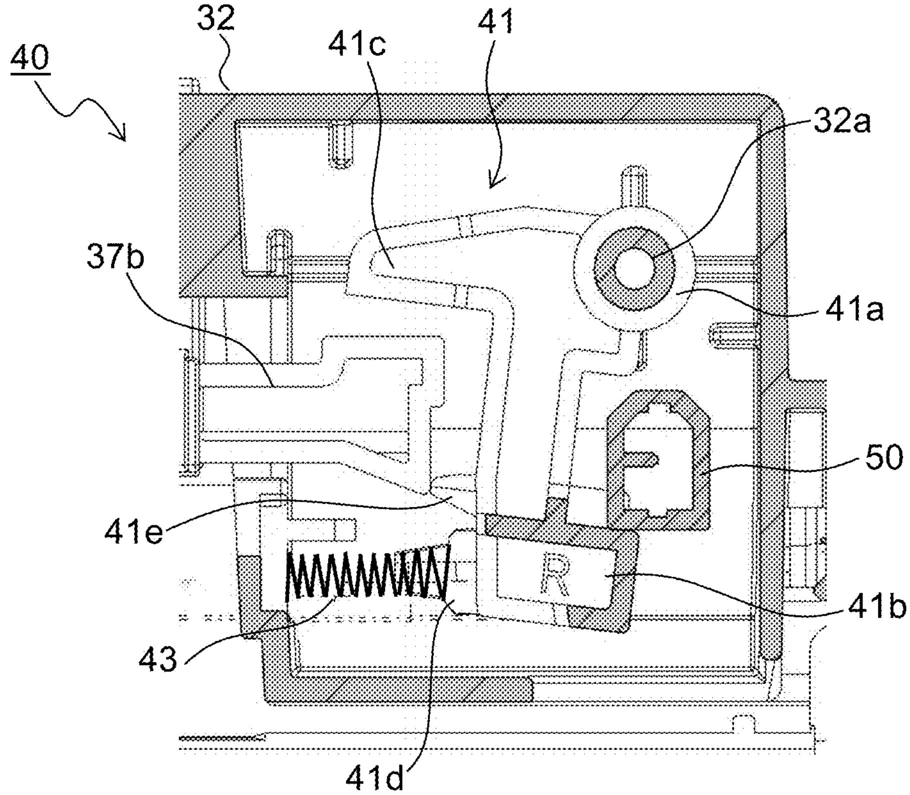
FIG. 7 A diagram illustrating a state where, from the state in FIG. 6, without the first handle portion 37 being pulled up, the lock member 41 has swung in a direction away from the engaged portion 50.

FIG. 7 is a diagram illustrating a state where, from the state in FIG. 6, without the first handle portion 37 being pulled up, the lock member 41 has swung in a direction away from the engaged portion 50. If, for example, vibration or impact is applied to the intermediate transfer unit 30 to swing the lock member 41 in the direction (second direction, clockwise direction in FIG. 7) away from the engaged portion 50, the restraint projection 41*e* is brought into contact with a side surface of the projecting portion 37*b* as illustrated in FIG. 7.

As a result, the lock member 41 is restrained from swinging, so that the hook portion 41*b* of the lock member 41 and the engaged portion 50 are kept in engagement with each other. Thereby, it is possible to effectively prevent the intermediate transfer unit 30 from rattling or falling off from the main body frame 101 due to disengagement of the lock member 41 from the engaged portion 50.

Figure 8:
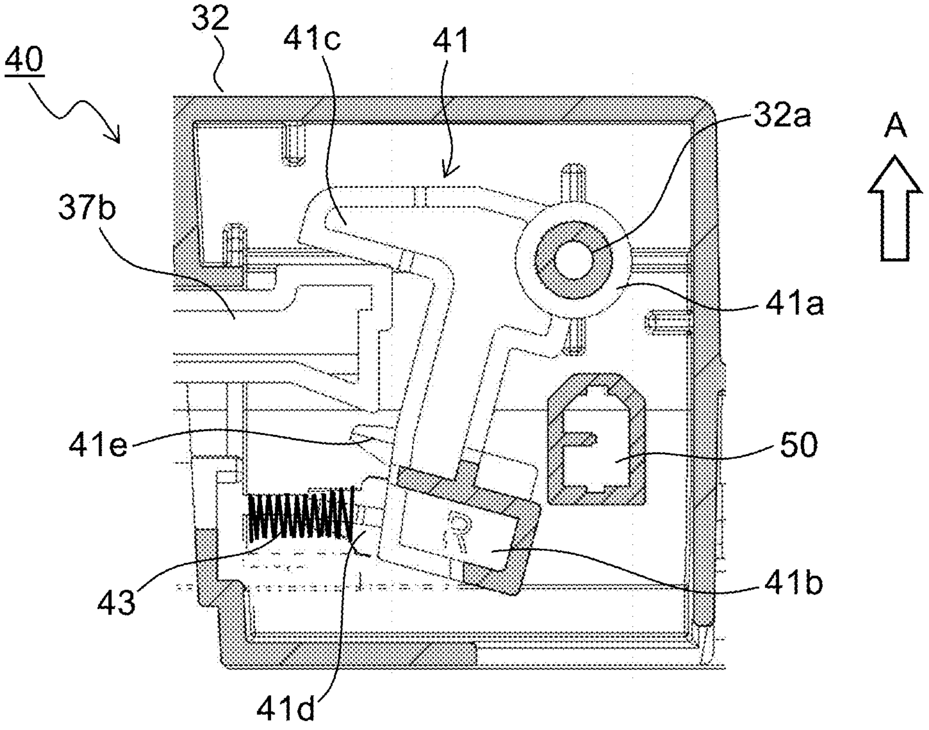
FIG. 8 A diagram illustrating a state where, from the state in FIG. 6, the first handle portion 37 has been pulled up and the lock member 41 has swung in the direction away from the engaged portion 50.

FIG. 8 is a diagram illustrating a state where, from the state in FIG. 6, the first handle portion 37 has been pulled up and the lock member 41 has swung in the direction away from the engaged portion 50. To release the lock mechanism 40 for the intermediate transfer unit 30, the grasp portion 37*a* of the first handle portion 37 is grasped to pull the first handle portion 37 upward (in the arrow A direction).

Thereby, as illustrated in FIG. 8, the projecting portion 37*b* of the first handle portion 37 is caused to push up the arm portion 41*c* of the lock member 41, due to which the lock member 41 swings clockwise (in the second direction). As a result, the hook portion 41*b* swings in the direction away from the engaged portion 50 while compressing the first compression spring 43, so that the engagement between the hook portion 41*b* and the engaged portion 50 is released, thereby enabling the intermediate transfer unit 30 to be detached.

Note that, on one hand the swing of the lock member 41 in the second direction causes the restraint projection 41*e* to approach the projecting portion 37*b*, but on the other hand the projecting portion 37*b* rises while pushing up the arm portion 41*c*. As a result, as shown in FIG. 8, the restraint projection 41*e* moves to a position below the projecting portion 37*b* (a position upstream of the projecting portion 37*b* in a movement direction of the projecting portion 37*b*), and thus there is no risk of the restraint projection 41*e* preventing lock release.

Figure 10:
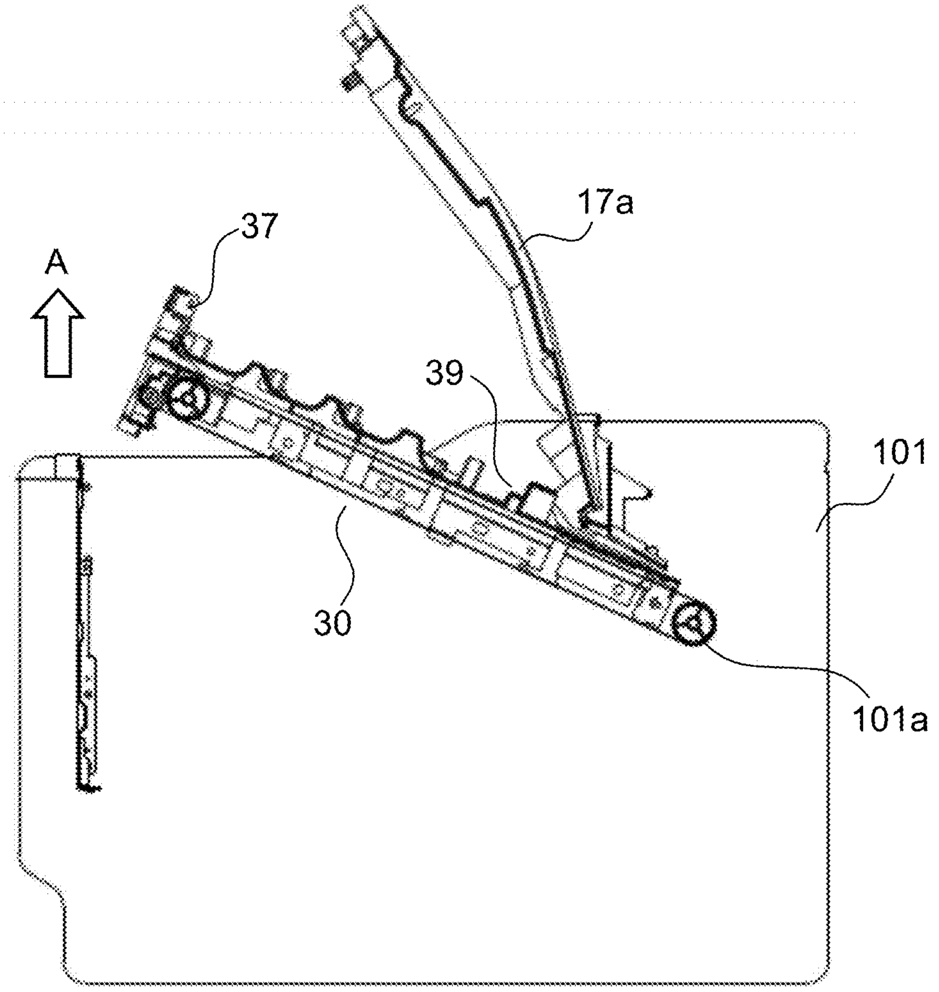
FIG. 10 A side view illustrating a state immediately before the intermediate transfer unit 30 is detached from the main body frame 101.

FIG. 9 is a side view illustrating a state where the intermediate transfer unit 30 is attached in the main body frame 101. FIG. 10 is a side view illustrating a state immediately before the intermediate transfer unit 30 is detached from the main body frame 101.

To detach the intermediate transfer unit 30 from the main body frame 101, first, an openable cover 17*a* which is a part of the discharge tray 17 (see FIG. 1) is opened to take out the toner containers 4*a* to 4*d* (see FIG. 1), so that the state illustrated in FIG. 9 is achieved. Next, with the first handle portion 37 pulled up, an apparatus front-side (in FIG. 10, left-side) end part of the intermediate transfer unit 30 is lifted upward (the detaching direction, the arrow A direction). Then, when the apparatus front-side end part of the intermediate transfer unit 30 is lifted up to a predetermined angle, the second handle portion 39 is grasped together with the first handle portion 37 to pull the bushes 35 (see FIG. 2) on an apparatus rear side (right side in FIG. 10) of the intermediate transfer unit 30 out of the positioning portions 101*a* so as to pull out the intermediate transfer unit 30 to the apparatus front side, and this completes the detaching of the intermediate transfer unit 30.

To attach the intermediate transfer unit 30 in the main body frame 101, first, with an apparatus front-side part of the intermediate transfer unit 30 lifted up as illustrated in FIG. 10, the bushes 35 on the apparatus rear side are fitted in the positioning portions 101*a*. Then, the apparatus front-side part of the intermediate transfer unit 30 is gradually lowered downward (in the attaching direction, the arrow A' direction).

When the apparatus front-side part of the intermediate transfer unit 30 is lowered downward, the lock member 41 approaches the engaged portion 50 on the main body frame 101. Meanwhile, since the first handle portion 37 is in the pulled-up state, the lock member 41 has the arm portion 41*c* pushed up by the projecting portion 37*b* and thus is kept in the state (the position in FIG. 8) of having swung in the second direction. Thus, the hook portion 41*b* lowers without contacting the engaged portion 50.

When the apparatus front-side part of the intermediate transfer unit 30 is lowered to a predetermined position, the hook portion 41*b* lowers to a position (see FIG. 8) below a lower end part of the engaged portion 50. In this state, when the grasp on the first handle portion 37 is released, the first handle portion 37 lowers due to its own weight. As a result, the projecting portion 37*b* also lowers, and thus, due to the biasing force of the first compression spring 43, the lock member 41 swings in the first direction.

Thereby, as illustrated in FIG. 6, the hook portion 41*b* and the engaged portion 50 are brought into engagement with each other, so that the intermediate transfer unit 30 is restrained from being detached. In the manner described above, the attaching of the intermediate transfer unit 30 with respect to the main body frame 101 is completed.

According to the configuration described above, to detach the intermediate transfer unit 30 from the image forming apparatus 100, simply by grasping and pulling up the first handle portion 37, the lock member 41 can be disengaged from the engaged portion 50. Further, the direction in which the first handle portion 37 is operated to release the lock mechanism 40 is the same (upward) direction in which the intermediate transfer unit 30 is detached, and thus it is possible to release the lock mechanism 40 and detach the intermediate transfer unit 30 simultaneously. This makes it possible for the user to release the lock mechanism 40 for the intermediate transfer unit 30 through a simple operation, without fastening screws or operating a rotary lever, and thus to replace the intermediate transfer unit 30 smoothly.

Further, to attach the intermediate transfer unit 30 in the image forming apparatus 100, simply by inserting the intermediate transfer unit 30 into the image forming apparatus 100, the hook portion 41*b* of the lock member 41 is brought into engagement with the engaged portion 50 of the main body frame 101. Thus, with the lock mechanism 40, the intermediate transfer unit 30 can be automatically locked in the main body frame 101 without any special operation.

Moreover, with the first handle portion 37 unraised, the restraint projection 41*e* restrains swinging of the lock member 41, and this helps eliminate the risk of disengagement between the lock member 41 and the engaged portion 50 due to vibration or impact during transportation. Thus, it is possible to effectively prevent the intermediate transfer unit 30 from rattling or coming off from the main body frame 101 due to vibration, falling, or the like during transportation.

As has been described above, as long as the first handle portion 37 is not pulled up, the lock member 41 does not swing, and thus the intermediate transfer unit 30 does not become unlocked. However, if the first handle portion 37 moves upward unintendedly, the lock member 41 may unfortunately be disengaged from the engaged portion 50 due to vibration or impact. To deal with this from happening, in the present embodiment, the restraint member 51 is provided which restrains movement of the first handle portion 37.

Figure 11:
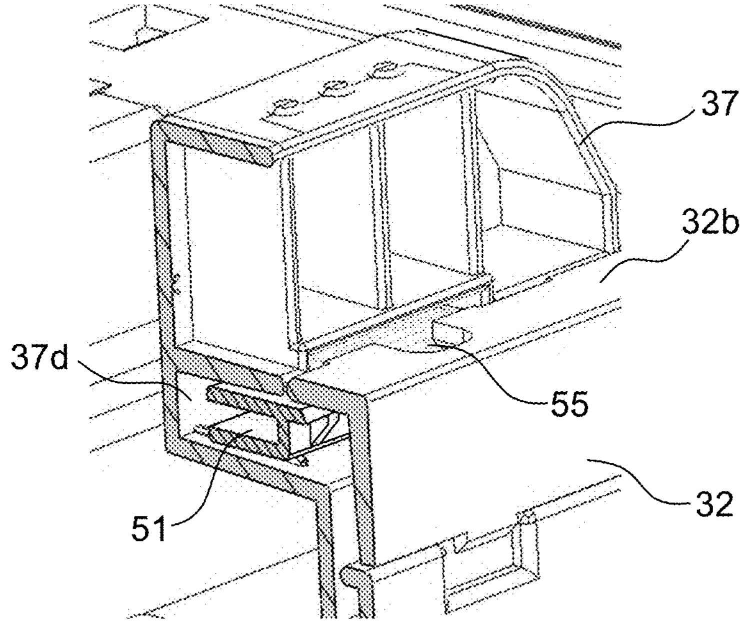
FIG. 11 A sectional perspective view of the first handle portion 37, illustrating a state where a restraint member 51 is located at a restraint position.
Figure 12:
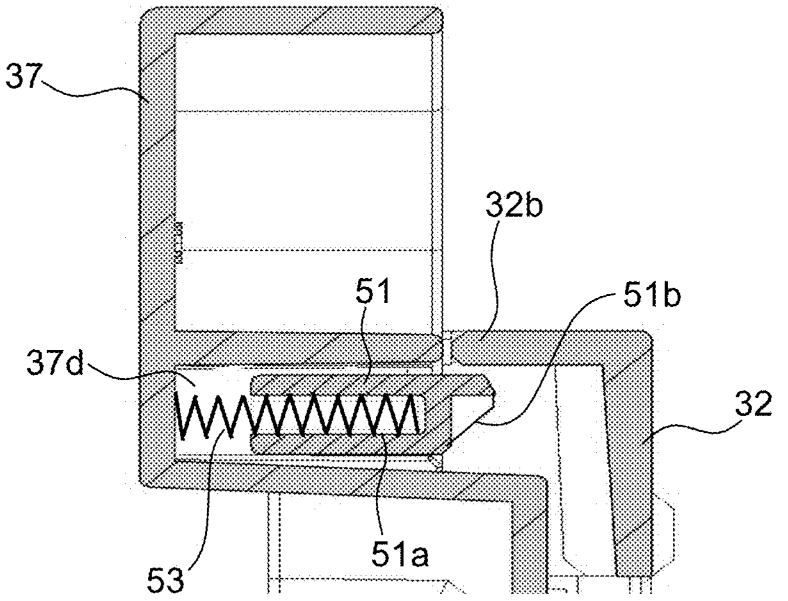
FIG. 12 A side sectional view of the first handle portion 37 in FIG. 11.

FIG. 11 is a sectional perspective view (taken along line XX' in FIG. 3) of the first handle portion 37, illustrating a state where the restraint member 51 is located at a restraint position. FIG. 12 is a side sectional view of the first handle portion 37 in FIG. 11. As illustrated in FIG. 11 and FIG. 12, in a holding portion 37*d* of the first handle portion 37, the restraint member 51 is disposed.

The restraint member 51 is a plate-shaped member having a predetermined length in a direction (perpendicular to the plane of FIG. 12) in which the first handle portion 37 extends. In the restraint member 51, a spring housing portion 51*a* is formed which has an opening on a side (the left side in FIG. 12) opposite to the connection frame 32. Inside the spring housing portion 51*a*, a second compression spring 53 is disposed, and the restraint member 51 is biased by the second compression spring 53 in a direction (a projecting direction) approaching the connection frame 32. At an end part of the restraint member 51 on a side where the connection frame 32 is located, there is formed an inclined surface 51*b* that is inclined upward from an upstream side toward a downstream side in the projecting direction.

With the lock member 41 and the engaged portion 50 in engagement with each other (see FIG. 6), as illustrated in FIG. 12, the restraint member 51 projects, due to a biasing force of the second compression spring 53, to a position (the restraint position) overlapping with a lower part of a flange portion 32*b* formed at an upper end of the connection frame 32. Thus, due to interference of the restraint member 51 and the flange portion 32*b*, upward movement of the first handle portion 37 is restrained. Thereby, it is possible to prevent the first handle portion 37 from moving upward unintendedly to release the engagement between the lock member 41 and the engaged portion 50.

Figure 13:
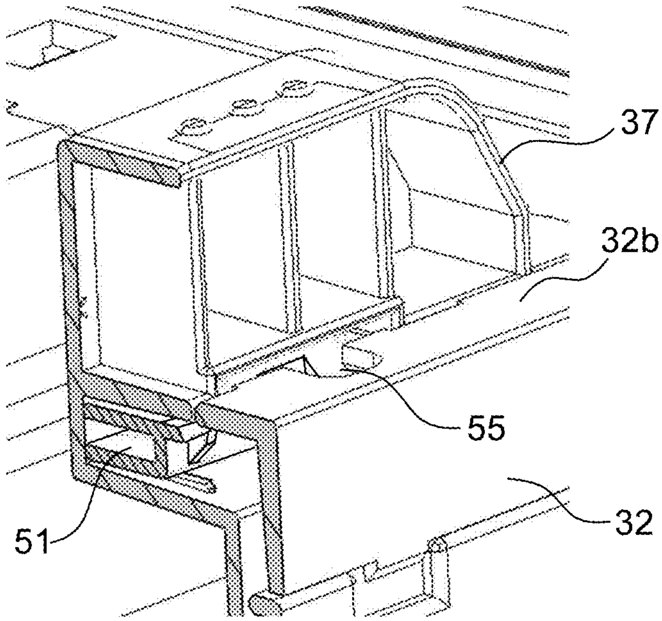
FIG. 13 A diagram illustrating a state where the restraint member 51 has been moved from the state in FIG. 11 to a release position.
Figure 14:
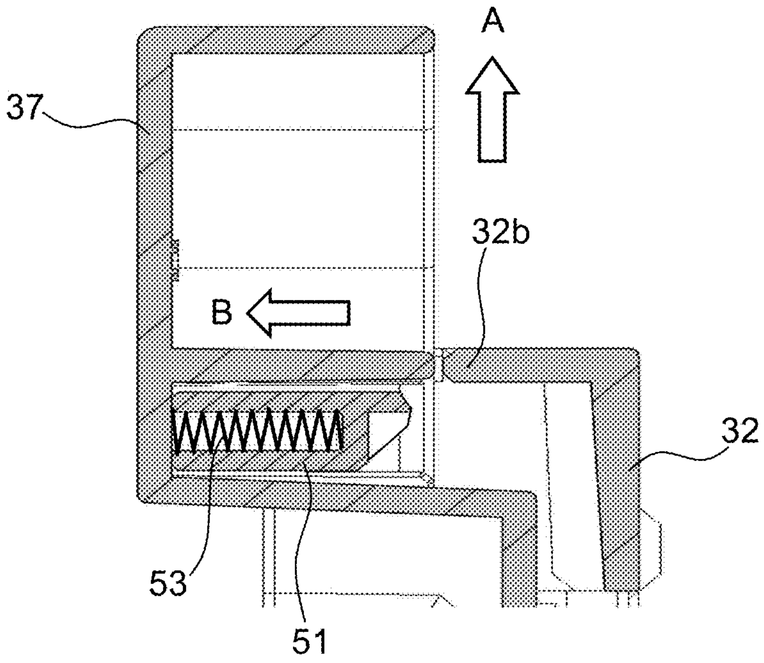
FIG. 14 A side sectional view of the first handle portion 37 in FIG. 13.

FIG. 13 is a diagram illustrating a state where the restraint member 51 has been moved from the state in FIG. 11 to a release position. FIG. 14 is a side sectional view of the first handle portion 37 in FIG. 13. To release the engagement between the lock member 41 and the engaged portion 50, as illustrated in FIG. 13 and FIG. 14, a jig (unillustrated) such as a screwdriver is inserted into an operation hole 55, which is formed in the flange portion 32*b*, so as to move the restraint member 51, against the biasing force of the second compression spring 53, in a direction (an arrow B direction) away from the connection frame 32, to a position (the release position) that does not overlap with the flange portion 32*b*. This allows the first handle portion 37 to move upward.

Figure 15:
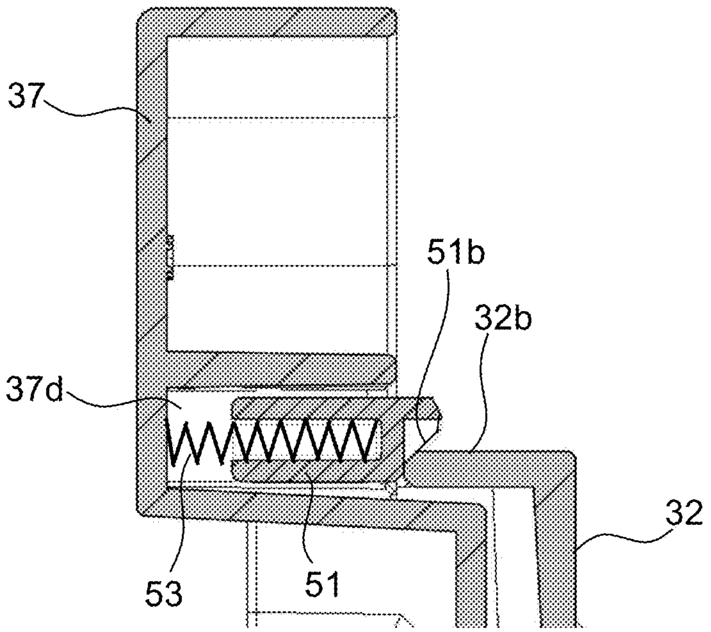
FIG. 15 A diagram illustrating a state where the first handle portion 37 has been pulled up from the state in FIG. 14.
Figure 16:
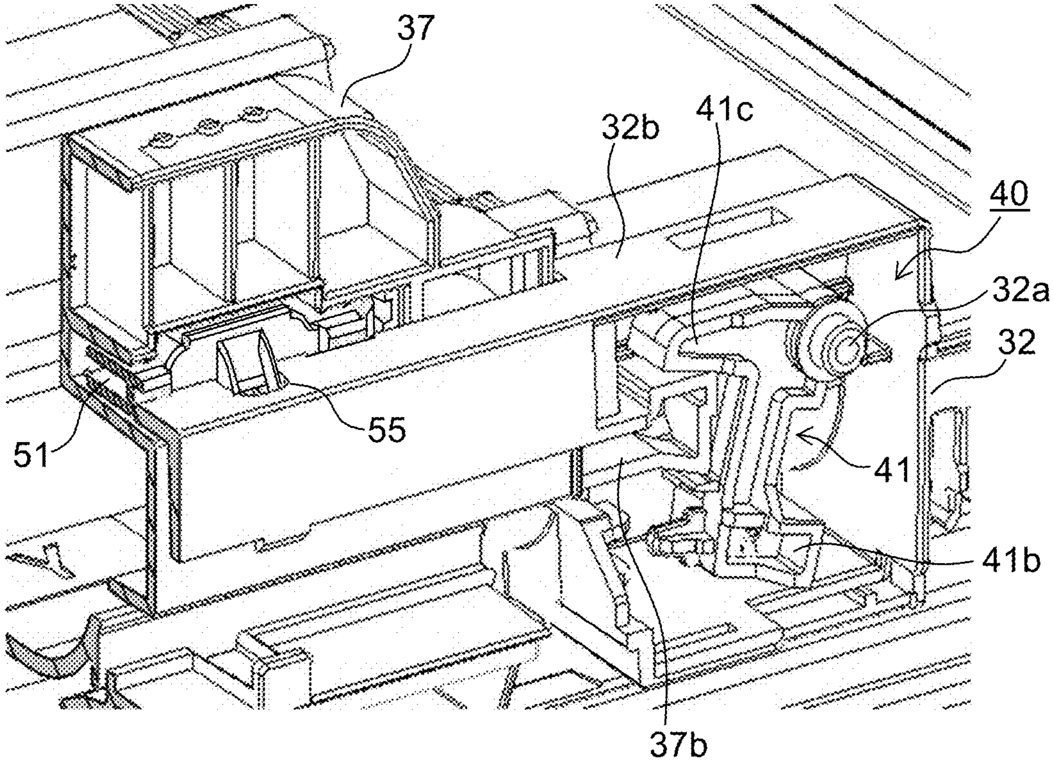
FIG. 16 A perspective view of the lock mechanism 40, illustrating how the lock member 41 swings due to the first handle portion 37 being pulled up.

FIG. 15 is a diagram illustrating a state where the first handle portion 37 has been pulled up from the state in FIG. 14. FIG. 16 is diagram illustrating how the lock member 41 swings due to the first handle portion 37 being pulled up. With the restraint member 51 being held at the release position with the jig, the first handle portion 37 is pulled up as illustrated in FIG. 15, and thereby, the projecting portion 37*b* is caused to lift up the arm portion 41*c* of the lock member 41 as illustrated in FIG. 16, as a result of which the lock member 41 swings in the second direction about the pivot shaft 32*a* as a pivot. Thereby, the engagement between the hook portion 41*b* and the engaged portion 50 (see FIG. 8) is released, which enables the intermediate transfer unit 30 to be detached.

Note that, after a leading edge of the restraint member 51 passes the flange portion 32*b*, the restraint member 51 does not need to be held in the release position with the jig. After passing the flange portion 32*b*, the restraint member 51 is, as illustrated in FIG. 15, biased by the biasing force of the second compression spring 53 to project so as to overlap with an upper part of the flange portion 32*b*.

To bring the hook portion 41*b* and the engaged portion 50 into engagement with each other, the first handle portion 37 is moved downward to thereby bring the inclined surface 51*b* of the restraint member 51 into contact with a leading edge of the flange portion 32*b* (see FIG. 15).

When the first handle portion 37 is moved further downward, the inclined surface 51*b* receives a reactive drag from the flange portion 32*b*. The restraint member 51 is movable in the horizontal direction inside the holding portion 37*d*, and thus, of the drag received from the flange portion 32*b*, a component force in the horizontal direction (leftward in FIG. 15) causes the restraint member 51 to move, against the biasing force of the second compression spring 53, in a direction (the arrow B direction) away from the flange portion 32*b*.

Thereafter, the inclined surface 51*b* lowers while in contact with the leading edge of the flange portion 32*b*. Then, after the inclined surface 51*b* moves over the leading edge of the flange portion 32*b*, no drag is received from the flange portion 32*b* any longer, and thus, due to the biasing force of the second compression spring 53, the restraint member 51 moves in the direction approaching the connection frame 32. As a result, as illustrated in FIG. 12, the restraint member 51 projects so as to overlap with the lower part of the flange portion 32*b*, so that upward movement of the first handle portion 37 is restrained.

The embodiments described above are in no way meant to limit the present invention, which thus allows for many modifications and variations within the spirit of the present invention. For example, in the embodiments described above, attaching and detaching of the intermediate transfer unit 30 is performed by raising and lowering one end of the intermediate transfer unit 30 in the up-down direction about the other end thereof as a pivot, but instead the intermediate transfer unit 30 may be inserted into and pulled out of the image forming apparatus 100 in the horizontal direction. Further, the present invention is applicable also to any units other than the intermediate transfer unit 30 as long as they are attachable and detachable with respect to the main body of the image forming apparatus 100.

Further, in the embodiments described above, the intermediate transfer unit 30 is inserted into the main body frame 101 after the first handle portion 37 is pulled upward to cause the lock member 41 to swing in the second direction, and thereby, contact is avoided between the hook portion 41*b* and the engaged portion 50. Instead of this configuration, a configuration is also possible where, with an inclined surface formed on the engaged portion 50 or the hook portion 41*b*, when inserting the intermediate transfer unit 30, the hook portion 41*b* and the engaged portion 50 contact each other at the inclined surface to thereby cause the lock member 41 to swing in the second direction.

Further, in the embodiments described above, the inclined surface 51*b* formed in the restraint member 51 is used to move the restraint member 51 to the release position, but instead, an inclined surface may be formed, in a top surface of the flange portion 32*b*, at a position at which the restraint member 51 contacts the flange portion 32*b*. Or, an inclined surface may be formed on each of the restraint member 51 and the flange portion 32*b*.

Further, the application of the present invention is not limited to tandem-type color printers such as the one illustrated in FIG. 1, but the present invention is applicable to various types of image forming apparatuses, such as monochrome copiers, digital multifunction peripherals, facsimile machines, and laser printers, that incorporate a unit that is attached and detached with respect to the main body of the image forming apparatus 100.

INDUSTRIAL APPLICABILITY

The present invention finds applications in image forming apparatuses that incorporate a unit that is attachable and detachable with respect to an apparatus main body. By using the present invention, it is possible to provide an image forming apparatus that is capable of securely holding a unit that is attachable and detachable with respect to an apparatus main body in a state of being locked in the apparatus main body without impairing the detachability of the unit.

The invention claimed is:

1. An image forming apparatus, comprising:

a unit that is attachable and detachable with respect to a main body frame; and a lock mechanism that releasably holds the unit in a state of being attached in the main body frame, wherein the lock mechanism includes a handle portion that is disposed on the unit and is reciprocatable in an attaching direction and a detaching direction of the unit, a lock member that is swingably disposed on the unit, and has a hook portion engageable with an engaged portion formed on the main body frame, and a first biasing member that biases the lock member in a first direction in which the hook portion engages with the engaged portion, due to the handle portion being moved in the detaching direction, the lock member is caused to swing against a biasing force of the first biasing member in a second direction opposite to the first direction so as to release engagement between the hook portion and the engaged portion, thereby enabling the unit to be detached from the main body frame, and the lock member includes a restraint portion that restrains swinging of the lock member in the second direction in a state where the handle portion is prevented from moving in the detaching direction.

2. The image forming apparatus according to claim 1, wherein the handle portion has a pair of projecting portions that project from left and right side surfaces of the handle portion, a pair of the lock members disposed at left and right sides of the handle portion, the lock members each having a boss portion that rotatably engages with a pivot shaft formed on the unit, the hook portion that extends from the boss portion in a radial direction, and an arm portion that extends from the boss portion in a direction different from the hook portion and contacts the projecting portion from an upstream side in the attaching direction, due to the handle portion being moved in the detaching direction, the projecting portion is caused to press the arm portion against the biasing force of the first biasing member in the detaching direction so as to cause the lock member swing in the second direction, thereby releasing the engagement between the hook portion and the engaged portion, and the restraint portion is a restraint projection that projects from a rear side of the hook portion of the lock member in a same direction as the arm portion, and when the lock member swings in the second direction in a state where the handle portion is prevented from moving in the detaching direction, the restraint projection contacts the projecting portion so as to restrain swinging of the lock member.

3. The image forming apparatus according to claim 2, wherein when the handle portion is moved in the detaching direction, along with swinging of the lock member in the second direction, the restraint projection moves to an upstream side of the projecting portion in a movement direction of the projecting portion so as to avoid contact with the projecting portion.

4. The image forming apparatus according to claim 1, further comprising:

a restraint member that is selectively disposed at a restraint position for restraining movement of the handle portion in the detaching direction and a release position for allowing the movement of the handle portion in the detaching direction.

5. The image forming apparatus according to claim 4, wherein the unit includes a pair of side frames, and a connection frame that is connected to one end parts of the side frames so as to bridge therebetween and on which the lock mechanism is provided, the unit being detachable and attachable by raising and lowering, with respect to the main body frame, a side of the unit where the connection frame is disposed, and the restraint member is movable to the restraint position projecting from the handle portion and overlapping with a lower part of a flange portion formed on the connection frame, and to the release position not overlapping with the flange portion.

6. The image forming apparatus according to claim 5, wherein the restraint member is biased by a second biasing member in a direction toward the restraint position, and, on at least one of the restraint member and the flange portion, an inclined surface inclined in a moving direction of the restraint member is formed at a part that contacts the flange portion or the restraint member when the unit is attached in the main body frame.

7. The image forming apparatus according to claim 5, wherein in the flange portion, an operation hole is formed for moving the restraint member, against a biasing force of the second biasing member, from the restraint position to the release position.

8. The image forming apparatus according to claim 1, wherein the unit is an intermediate transfer unit including an intermediate transfer belt which is endless and on which toner images to be transferred to a recording medium are sequentially superimposed one on another, and a plurality of suspension rollers around which the intermediate transfer belt is stretched.

* * * * *